June 9, 1959  A. S. VANDERHOOF  2,889,581
METHOD OF EXTRUDING PLASTIC MATERIAL
Filed March 8, 1955
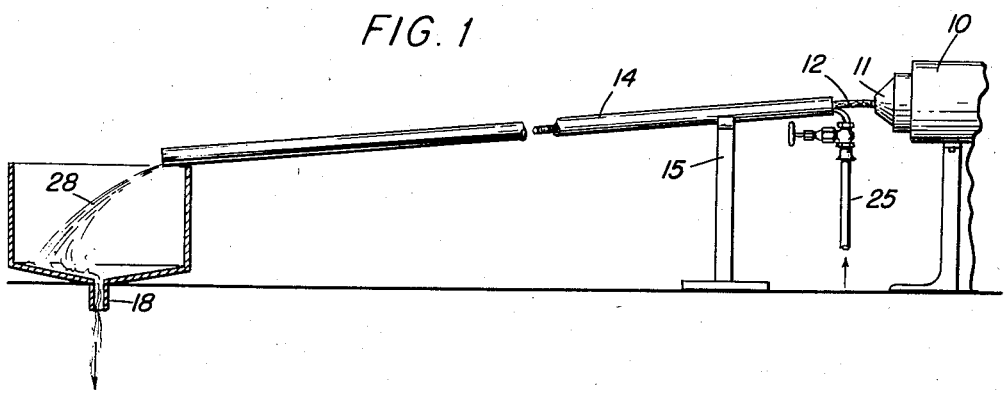
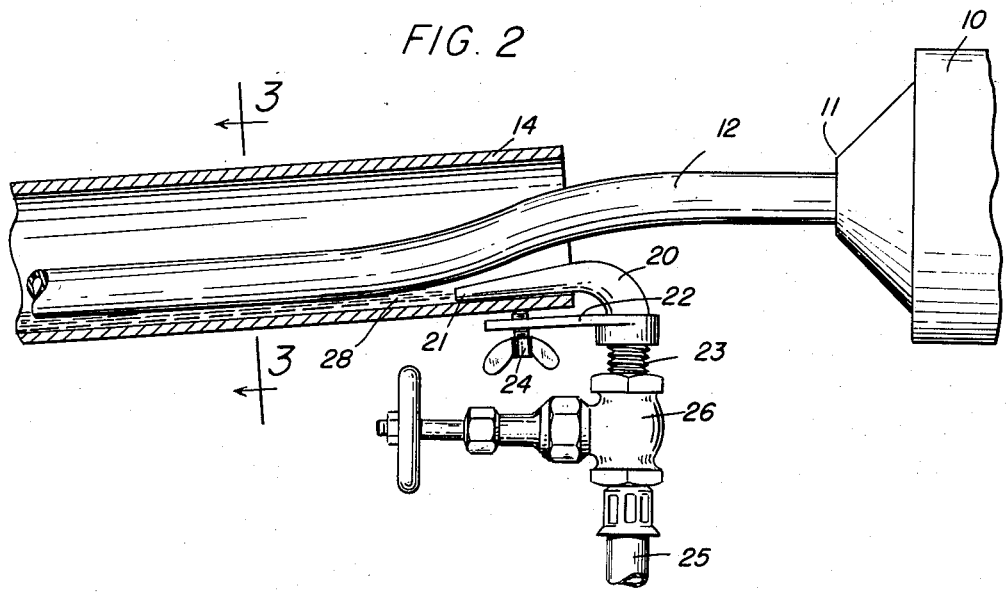
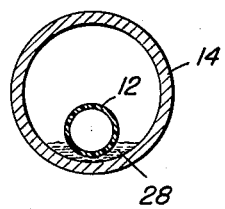
INVENTOR.
Alton S. Vanderhoof
BY
Churchill, Rich, Weymouth & Engel
Attorneys 2,889,581

METHOD OF EXTRUDING PLASTIC MATERIAL

Alton S. Vanderhoof, Irvington, N.J., assignor to Resistoflex Corporation, Belleville, N.J., a corporation of New York Application March 8, 1955, Serial No. 492,896

6 Claims. (Cl. 18—55)

This invention relates to the making of elongated plastic articles, more particularly to methods of handling and treating extruded articles such as tubing and other shapes.

In the manufacture of extruded articles of polytetrafluoroethylene (better known by its trade name "Teflon," which term will hereinafter be used) one of the methods used is so-called "paste extrusion." This process involves mixing fine "Teflon" powder with a volatile liquid, pressing the mixture into preforms and extruding the preforms though a die orifice to form the desired shape. The extruded article is quite soft and must be handled with extreme care until it has been baked to evaporate the volatile components and sintered, which converts the paste into a very tough material. In the making of tubing it has heretofore been extruded onto a cylindrical mandrel of relatively short length, say 3 or 4 feet. However, the use of a mandrel is not desirable because, for a number of reasons, it limits the length of the tubing which can be made. Furthermore, the mandrels must be handled with great care through the steps of baking and sintering to prevent damage to the freshly extruded article which is on its outer surface.

According to the invention, "Teflon" tubing, or any other desired shape, is extruded directly into a length of rigid pipe which not only supports the delicate freshly extruded article but protects it, makes it much easier to handle and effects economies in space and equipment since the pipes may be stacked one on top of another for storage and in the oven, the unfinished tubing or the like being on the inside of the pipes.

In carrying out this process, however, difficulty was encountered in pushing the freshly extruded material into a pipe of considerable length, say 20 feet or more. If the material is extruded too rapidly it tends to buckle because of friction against the inside of the pipe and thus becomes deformed and this has heretofore been a definite limitation on the rate of extrusion as well as on the lengths which could be made. The pipes, which are used over and over again, are also subject to damage in handling and may acquire dents. The inside surfaces also develop rough spots due to oxidation in the oven and the accumulation of dirt, dust and hard particles, which may adhere to sticky spots, making it even more difficult to insert the extruded article at a satisfactory rate of speed and without scoring it by abrasion.

Various expedients which have been tried to speed up the rate at which freshly extruded "Teflon" articles could be inserted in pipes or to increase the lengths which could be so inserted, such as coating the inside of the pipe with various lubricants, frequent cleaning and polishing of the inside surface, were of little avail. Another attempt to solve the problems involved the introduction into the pipe of a tape which could be drawn through at the same rate as the insertion but this was not satisfactory and very time-consuming. Attaching a vibrator to the pipe was of some help but not adequate to the need for introducing the article at the same rate as the highest possible rate of extrusion, which is the only economical way to operate.

The invention solves the above mentioned problems by providing within the pipe a moving stream of continuously flowing liquid which serves to lubricate the bottom wall of the pipe and to float along the soft extruded article which is being pushed into it, carrying it over rough or sticky spots, small dents and the like, eliminating friction and any danger of abrasion.

The invention will best be understood by reference to the following detailed description of the present preferred embodiment thereof taken in conjunction with the drawings, in which:

Fig. 1 is an elevation of one form of apparatus suitable for practicing the invention;

Fig. 2 is an enlarged detail, partly in central vertical section, of the upper end of the pipe and fluid supply means; and Fig. 3 is a transverse section taken on the line 3—3 of Fig. 2.

Referring to Fig. 1, it shows the front end of an extruder 10 having an orifice 11 with the extruded material 12 emitted therefrom. This material is introduced directly into a pipe 14 of larger internal diameter than the material 12, which pipe is supported at a slight angle to the horizontal on a rest 15 and over the edge of a liquid receptacle 16 having a drain-pipe 18. The pipe size is selected according to the diameter of the extruded article so that there is considerable free space. There is nothing critical about the relative dimensions.

Referring to Fig. 2, a liquid nozzle 20, preferably flattened at its end 21, is arranged for insertion in the upper end of the pipe 14 and may be provided with a suitable clamping arm 22 rotatably attached to threaded portion 23 and containing a locking screw 24 which may be tightened against the outside wall of the pipe. Nozzle 20 is connected to a flexible hose 25 or other conduit through a suitable hand valve 26 which can be used to shut off or regulate the liquid flow.

Before the extruded material 12, such as tubing, is introduced into pipe 14, the nozzle 20 is put in place, the valve 26 is opened and a flowing stream 28 of expendable liquid, preferably water, is established in the pipe. Due to the slope of the pipe, this water runs continuously along the bottom and is fed in at a sufficient rate to provide a stream of some depth all along the bottom as shown in Fig. 3. The extruder 10 is then started and the tubing or the like introduced on top of this flowing stream, as shown in Fig. 2, which carries it through the pipe at as fast a rate as it can be produced by the extruder.

When the tubing 12 and the like has been produced in a length sufficient to extend from one end of the pipe to the other, the extruder is stopped, the tubing cut off at the upper end of the pipe, the valve 26 is closed, the nozzle 20 is removed and a new pipe is put in place. Substantially all of the water drains out of the pipe and it is ready for removal to the oven.

It has been found in practice that all the difficulties heretofore experienced in attempting to introduce soft plastic materials into relatively long lengths of pipe are eliminated. Even where the pipe is irregular or rough on its lower inside surface as a result of dents, abrasions, corrosions or accumulations of dirt, the plastic moves therethrough without damage. It has been found that a tendency of the soft plastic to become scored on its lower surface, as happens in a dry pipe, is wholly eliminated.

As an illustration of the advantage attained by this method with respect to speed, it was found that "Teflon" tubing, which has a very low coefficient of friction, could not safely be extruded into a dry, clean, smooth pipe of stainless steel at a rate in excess of 3½ to 4 feet per minute. Using the method of the invention the same tubing can be extruded into pipe as fast as it can be extruded, which up to the present time is 12 feet per minute, without any indication that there is any maximum speed at which difficulties will arise. While water has proved to be entirely satisfactory with "Teflon," which is almost completely inert, it is contemplated that with other plastics it might be desirable to use a different liquid. If it is too costly to discard, a recirculating system might be used instead of sending the liquid to waste. If a greater buoyant effect is desired than is obtained with water, liquids of higher specific gravity may be used. The buoying up and carrying along of the extruded article, however, is due not merely to the presence of the liquid but to the fact that it is in rapid motion.

Many changes and improvements may of course be made in the specific apparatus shown and described. For example, the hand valve 26 may be replaced by a lever type valve with spring closing means which would be actuated automatically by placing a pipe in position to receive the extruded article. It is to be understood therefore that the invention is not limited to any particular apparatus but is to be construed broadly within the purview of the claims.

What is claimed is:

1. In the making of polytetrafluoroethylene tubing of considerable length by extrusion from paste followed by heating to sinter at an elevated temperature, the steps of introducing a discrete length in excess of four feet of the freshly extruded tubing into a pipe at least as long as the tubing and substantially larger in internal diameter than the outside diameter of the tubing such as to provide considerable free space, placing the pipe containing the tubing in an oven, heating the tubing to sinter it while it remains free of longitudinal translatory motion in the pipe supported thereby in the oven, and thereafter removing the sintered tubing from the pipe.

2. In the making of polytetrafluoroethylene articles of considerable length by extrusion from paste followed by heating to sinter at an elevated temperature, the steps of introducing a separate length in excess of four feet of the freshly extruded article into a pipe at least as long as the article and substantially larger in internal cross-section than the outside cross-section of the article such as to provide considerable free space, placing the pipe containing the article in an oven, and heating the article to sinter it while it remains free of longitudinal translatory motion in the pipe supported thereby in the oven.

3. In the making of polytetrafluoroethylene articles of considerable length by extrusion from paste followed by heating to sinter at an elevated temperature, the steps of extruding a discrete length in excess of four feet of the article directly into a pipe at least as long as the article and substantially larger in internal cross-section than the ouside cross-section of the article such as to provide considerable free space, placing the pipe containing the article in an oven, and heating the article to sinter it while it remains free of longitudinal translatory motion in the pipe supported thereby in the oven.

4. In the making of polytetrafluoroethylene articles of considerable length in excess of four feet by extrusion from paste followed by heating to sinter at an elevated temperature, the steps of establishing and maintaining a longitudinally rapidly moving stream of continuously flowing liquid throughout the length of a pipe covering the bottom of the inner wall thereof, said pipe being at least as long as the article to be extruded and substantially larger in internal cross-section than the outside cross-section of the article such as to provide considerable free space, continuously introducing the freshly extruded article onto said stream at the upstream end such that the free leading end of the article is floated and conveyed along the length of the pipe by said rapidly moving stream to a point short of the downstream end of said stream, interrupting said stream of liquid, placing the pipe containing the article in an oven, and heating the article to sinter it while it remains free of longitudinal translatory motion in the pipe supported thereby in the oven.

5. In the making of polytetrafluoroethylene articles of considerable length in excess of four feet by extrusion from paste followed by heating to sinter at an elevated temperature, the steps of disposing at an angle to the horizontal an open-ended pipe at least as long as the article to be extruded and substantially larger in internal cross-section than the outside cross-section of the article such as to provide considerable free space, establishing and maintaining a longitudinally rapidly moving stream of continuously flowing liquid throughout the length of pipe from the higher to the lower end thereof of sufficient volume to cover the bottom of the inner wall of the pipe, extruding said article directly into the higher end of said pipe onto said stream such that the free leading end of the article is floated and conveyed along the length of the pipe by said rapidly moving stream to a point short of the downstream end of said stream, interrupting said stream of liquid, placing the pipe containing the article in an oven, and heating the article to sinter it while it remains free of longitudinal translatory motion in the pipe supported thereby in the oven.

6. In the making of polytetrafluoroethylene tubing of considerable length in excess of four feet by extrusion from paste followed by heating to sinter at an elevated temperature, the steps of disposing at an angle to the horizontal an open-ended pipe at least as long as the tubing to be extruded and substantially larger in internal diameter than the outside diameter of the tubing such as to provide considerable free space, the higher end of the pipe being placed adjacent the mouth of the extruder, establishing and maintaining a longitudinally rapidly moving stream of continuously flowing liquid throughout the length of the pipe from the higher to the lower end thereof of sufficient volume to cover the bottom of the inner wall of the pipe, extruding tubing directly into the higher end of said pipe onto said stream such that the free leading end of the tubing is floated and conveyed along the length of the pipe by said rapidly moving stream to a point short of the downstream end of said stream, halting the extrusion and severing the tubing at a point between the pipe and the extruder, interrupting said stream of liquid, placing the pipe containing the tubing in an oven, and heating the tubing to sinter it while it remains free of longitudinal translatory motion in the pipe supported thereby in the oven.

References Cited in the file of this patent

UNITED STATES PATENTS

| 1,370,800 | Egerton | Mar. 8, 1921 |
| 2,375,827 | Slaughter | May 15, 1945 |
| 2,378,539 | Dawihl | June 19, 1945 |
| 2,400,094 | Benning | May 14, 1946 |
| 2,655,690 | Henning | Oct. 20, 1953 |
| 2,683,285 | Ramsey | July 13, 1954 |
| 2,685,707 | Llewellyn et al. | Aug. 10, 1954 |

FOREIGN PATENTS

| 686,438 | Great Britain | Jan. 21, 1953 |